(12) United States Patent
Barnes et al.

(10) Patent No.: US 6,211,599 B1
(45) Date of Patent: Apr. 3, 2001

(54) MICROELECTROMECHANICAL RATCHETING APPARATUS

(75) Inventors: Stephen M. Barnes; Samuel L. Miller; Brian D. Jensen; M. Steven Rodgers; Michael S. Burg, all of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/366,505

(22) Filed: Aug. 3, 1999

(51) Int. Cl.[7] .............................. H02N 1/00; H02N 10/00; H02K 33/10; F16H 27/02
(52) U.S. Cl. .................................. 310/309; 310/40 MM; 310/307; 74/128
(58) Field of Search ...................... 310/40 MM, 80, 310/306, 307, 308, 309; 74/44, 126, 128, 129, 130

(56) References Cited

U.S. PATENT DOCUMENTS

| | | | |
|---|---|---|---|
| 2,935,628 | * | 5/1960 | Taylor .................................. 310/307 |
| 3,202,842 | * | 8/1965 | Sherwood ............................. 310/307 |
| 3,204,133 | * | 8/1965 | Tschudin ............................... 310/309 |
| 3,418,499 | * | 12/1968 | Lester .................................... 310/306 |
| 4,062,250 | * | 12/1977 | Lahl ........................................ 74/415 |
| 4,602,527 | * | 7/1986 | Tamiya ................................... 74/713 |
| 5,013,954 | * | 5/1991 | Shibaike et al. ...................... 310/309 |
| 5,378,583 | | 1/1995 | Guckel .................................. 430/325 |
| 5,631,514 | | 5/1997 | Garcia .................................. 310/309 |
| 5,874,798 | * | 2/1999 | Wiegele et al. ....................... 310/168 |
| 5,917,260 | * | 6/1999 | Garcia et al. ........................... 310/80 |
| 5,959,376 | | 9/1999 | Allen .............................. 310/40 MM |
| 6,069,419 | * | 5/2000 | Tabib-Azar .................... 310/40 MM |

OTHER PUBLICATIONS

U.S. application No. 09/150,873, Allen, filed Sep. 10, 1998.
J.H. Comtois and V.M. Bright, "Surface Micromachined Polysilicon Thermal Actuator Arrays and Applications," *Proceedings of the Solid–State Sensor and Actuator Workshop*, pp. 174–177 (Jun. 2, 1996).
J.H. Comtois, M.A. Michalicek and C.C. Barron, "Fabricating Micro–Instruments in Surface–Micromachined Polycrystalline Silicon," Proceedings of the 43rd International Instrumentation Symposium Instrument Society of America, pp. 169–179 (1997).

* cited by examiner

*Primary Examiner*—Nestor Ramirez
*Assistant Examiner*—Dang Dinh Le
(74) *Attorney, Agent, or Firm*—John P. Hohiman

(57) ABSTRACT

A microelectromechanical (MEM) ratcheting apparatus is disclosed which includes an electrostatic or thermal actuator that drives a moveable member in the form of a ring gear, stage, or rack. Motion is effected by one or more reciprocating pawls driven by the actuator in a direction that is parallel to, in line with, or tangential to the path. The reciprocating pawls engage indexing elements (e.g. teeth or pins) on the moveable member to incrementally move the member along a curved or straight path with the ability to precisely control and determine the position of the moveable member. The MEM apparatus can be formed on a silicon substrate by conventional surface micromachining methods.

45 Claims, 9 Drawing Sheets

Section 1 - 1

MICROELECTROMECHANICAL RATCHETING APPARATUS

GOVERNMENT RIGHTS

This invention was made with Government support under Contract No. DEAC04-94AL85000 awarded by the U.S. Department of Energy. The Government has certain rights in the invention.

FIELD OF THE INVENTION

The present invention relates generally to microelectromechanical (MEM) devices, and specifically to a MEM ratcheting apparatus in which motion is provided to a moveable member (e.g. a gear, stage or rack) by one or more reciprocating ratchets engaged with a plurality of indexing teeth or pins on the moveable member, with the motion being generated by an electrostatic or thermal actuator.

BACKGROUND OF THE INVENTION

Polysilicon surface micromachining adapts planar fabrication process steps known to the integrated circuit (IC) industry to manufacture microelectromechanical or micromechanical devices. The standard building-block processes for polysilicon surface micromachining are deposition and photolithographic patterning of alternate layers of low-stress polycrystalline silicon (also termed polysilicon) and a sacrificial material (e.g. silicon dioxide or a silicate glass). Vias etched through the sacrificial layers at predetermined locations provide anchor points to a substrate and for mechanical and electrical interconnections between the polysilicon layers. Functional elements of the device are built up layer by layer using a series of deposition and patterning process steps. After the device structure is completed, it can be released for movement by removing the sacrificial material in part or entirely by exposure to a selective etchant such as hydrofluoric acid (HF) which does not substantially attack the polysilicon layers.

The result is a construction system generally consisting of a first layer of polysilicon which provides electrical interconnections and/or a voltage reference plane (e.g. a ground plane), and up to three or more additional layers of mechanical polysilicon which can be used to form functional elements ranging from simple cantilevered beams to complex systems such as an electrostatic motor connected to a gear train. Typical in-plane lateral dimensions of the functional elements can range from one micron to several hundred microns or more, while individual layer thicknesses are typically about 1–3 microns. Because the entire process is based on standard IC fabrication technology, a large number of fully assembled devices can be batch-fabricated on a silicon substrate without any need for piece-part assembly.

For various types of MEM devices, a precise control over movement or positioning is needed. Such precise movement control is difficult using present MEM motors or microengines (see e.g. U.S. Pat. No. 5,631,514 to Garcia et al which discloses a MEM engine which rotates a gear in substantially 90° increments and requires multiple complex drive signals).

The use of a reciprocating shuttle to form a wedge-type stepping motor as disclosed in U.S. Pat. No. 5,959,376 to Allen provides an improvement in precise positioning of a gear. However, the reciprocating shuttle produces an unbalanced actuation force on a hub about which the gear rotates, thereby limiting the durability and reliability of such a device.

An advantage of the present invention is a MEM apparatus is provided which provides a precise open-loop positioning of a moveable member such as a ring gear, a stage, or a rack by using a ratcheting mechanism.

Another advantage of the present invention is that a rotary MEM apparatus formed according to the present invention has actuation forces that are substantially balanced to minimize wear and thereby improve reliability.

Yet another advantage is that manufacturing tolerances (e.g. due to photomask misalignment) can be less critical compared to other MEM devices since motion of a majority of the elements in the MEM actuator of the present invention is limited to small angles and distances rather than requiring full rotation about an axis.

Another advantage of the present invention is that the MEM apparatus operates with simple drive signals, with the rotation or translation of a moveable member being precisely determinable from the drive signals.

Still another advantage of the present invention is that a relatively high torque can be provided to a moveable member (e.g. a gear, stage, or rack) without the need for any additional gears.

A further advantage of the present invention is that an electrostatic or thermal actuator for driving the moveable member can be located within an outline of the member so that no additional space is required on a substrate.

These and other advantages of the method of the present invention will become evident to those skilled in the art.

SUMMARY OF THE INVENTION

The present invention relates to a microelectromechanical (MEM) ratcheting apparatus formed on a substrate. The MEM apparatus comprises a member (e.g. a ring gear, a rotary stage, or a rack) that is moveable about a straight or curved path, with the moveable member having a plurality of indexing elements (e.g. teeth, or pins extending outward from a surface or edge of the moveable member) spaced along the path; an actuator providing reciprocating motion substantially in the direction of the path (i.e. parallel, or in-line or tangential to the path); and one or more pawls operatively connected to the actuator and engageable with the indexing elements to urge the moveable member along the path. The MEM ratcheting apparatus is preferably formed on a silicon substrate, with the moveable member preferably comprising polycrystalline silicon (also termed polysilicon). In the MEM ratcheting apparatus, the actuator can be either an electrostatic actuator or a thermal actuator.

In embodiments of the present invention employing an electrostatic actuator, the electrostatic actuator further comprises a plurality of pairs of electrostatic arms, with one electrostatic arm of each pair being stationary, and with the other electrostatic arm of each pair being moveable in response to a voltage applied across the pair of electrostatic arms. The stationary and moveable electrostatic arms of each pair of electrostatic arms can be either oriented substantially parallel to each other or can be oriented at an angle of generally less than twenty degrees with respect to each other. The plurality of moveable electrostatic arms can further be ganged together by attaching these arms to a support frame (e.g. comprising a plurality of concentric rings). The support frame can also be used to support each pawl at one end thereof.

One or more stops are preferably provided to prevent contact between the moveable electrostatic arm and the stationary electrostatic arm in each pair of electrostatic arms;

and at least one restoring spring is preferably used to restore (i.e. return) the moveable electrostatic arms to a rest position in the absence of the applied voltage (i.e. when the applied voltage is reduced below a threshold value). Furthermore, the stationary and moveable electrostatic arms can include a plurality of interdigitated fingers (e.g. forming a comb actuator or a hybrid actuator as described hereinafter), with the individual fingers being either substantially straight, angled, or curved. Finally, an electrostatic shield can be provided between the stationary electrostatic arm of one pair of electrostatic arms and the moveable electrostatic arm of an adjacent pair of the plurality of electrostatic arms to reduce or eliminate an unwanted electrostatic force of attraction.

In embodiments of the present invention employing a thermal actuator, the thermal actuator further comprises a plurality of pairs of thermal arms spaced about a central axis of rotation and extending outward therefrom, with each pair of thermal arms including a hot arm and a cold arm interconnected at an end of each hot arm located distally to the central axis, the hot arm thermally expanding to a greater extent than the cold arm in response to a voltage applied across each pair of hot and cold arms, thereby incrementally rotating each pair of thermal arms about the central axis. Each pair of thermal arms is operatively connected to drive a pawl which engages the indexing element to urge the moveable member along the path.

The action of each pawl to engage the indexing elements of the moveable member and urge the member incrementally along its path can be selected to occur either upon the application of the voltage to the actuator (i.e. so that the movement of the pawl is directly driven by the actuator), or upon the removal of the voltage from the actuator (i.e. reduction of the voltage below a threshold value so that the movement of the pawl is directly driven by the restoring spring, or by a thermal contraction of a hot arm of a thermal actuator upon cooling). In some instances, an anti-reverse mechanism can be provided to limit movement of the member to a single direction along the path.

The present invention further relates to a MEM ratcheting apparatus formed on the substrate that comprises an annular rotary member (e.g. a ring gear or a stage) centered about an axis and having an inner circumference and an outer circumference, with one of the inner or outer circumference including a plurality of indexing elements (e.g. teeth or pins); an actuator located proximate to the annular member and producing reciprocating motion; and at least one pawl operatively connected to the actuator and moveable tangentially to the annular member to engage the indexing elements and incrementally rotate the annular member. The actuator can be either an electrostatic actuator or a thermal actuator.

In embodiments of the present invention as described above that are based on an electrostatic actuator, the electrostatic actuator further comprises a plurality of pairs of electrostatic arms, with one electrostatic arm of each pair being stationary, and with the other electrostatic arm of each pair being moveable in response to a voltage applied across the pair of electrostatic arms. The electrostatic actuator can also include an electrostatic shield located between the stationary electrostatic arm of one pair of the plurality of electrostatic arms and the moveable electrostatic arm of an adjacent pair of the plurality of electrostatic arms. Additionally, one or more stops can be provided to prevent contact between the moveable electrostatic arm and the stationary electrostatic arm in each pair of electrostatic arms; and at least one restoring spring is generally operatively connected to the moveable electrostatic arms to restore the moveable electrostatic arms to a rest position in the absence of a voltage applied to the electrostatic actuator. Each pawl can be oriented to engage the indexing teeth and incrementally rotate the annular member either upon application of the voltage to the electrostatic actuator, or upon removal of the voltage from the electrostatic actuator (e.g. with the restoring spring driving each pawl to rotate the indexing teeth incrementally).

Depending on whether the moveable member is a ring gear or a stage, the electrostatic actuator can be located outside the rotary member (e.g. with the stationary and moveable electrostatic arms of each pair of electrostatic arms generally being oriented substantially parallel to each other), or located inside the inner circumference of the rotary member (e.g. with the stationary and moveable electrostatic arms of each pair of electrostatic arms generally being oriented at an angle of less than about 20° with respect to each other). The stationary and moveable electrostatic arms of each pair of electrostatic arms can further include a plurality of interdigitated fingers (e.g. to form a comb actuator, or to form a hybrid actuator having interdigitated fingers which act in combination with parallel electrostatic plates).

In embodiments of the present invention employing a thermal actuator, the thermal actuator further comprises a plurality of pairs of thermal arms spaced about a central axis of rotation of the rotary member and extending outward therefrom, with each pair of thermal arms including a hot arm and a cold arm interconnected at an end of each hot arm located distally to the axis. The hot arm thermally expands to a greater extent than the cold arm in response to a voltage applied across each pair of hot and cold arms, with the heating and subsequent cooling of the hot arm acting to incrementally rotate each pair of thermal arms about the central axis. Each pair of thermal arms is operatively connected to drive a pawl which engages the indexing element to urge the rotary member about the axis.

The present invention also relates to a MEM ratcheting apparatus that comprises a ring gear rotatable about an axis and having a plurality of indexing teeth spaced about an inner circumference thereof and a plurality of drive teeth spaced about an outer circumference thereof; a rotary electrostatic actuator formed within the inner circumference of the ring gear; and at least one pawl operatively connected to the moveable electrostatic arm and engageable with the ring gear to incrementally rotate the ring gear upon application or removal of an applied voltage. The electrostatic actuator further comprises a plurality of pairs of electrostatic arms arranged about the axis and extending outward therefrom, and at least one restoring spring operatively connected to the moveable electrostatic arms to restore the moveable electrostatic arms to a rest position upon removable of the applied voltage. Each pair of electrostatic arms includes a stationary electrostatic arm and a moveable electrostatic arm, and with the moveable electrostatic arm being rotatable incrementally about the axis in response to the applied voltage. In these embodiments of the present invention, the substrate preferably comprises silicon; and the ring gear preferably comprises polycrystalline silicon.

The stationary and moveable electrostatic arms of each pair of electrostatic arms in these embodiments of the present invention can be oriented substantially parallel to each other, or at an angle of generally less than 20° with respect to each other. The stationary and moveable electrostatic arms of each pair of electrostatic arms can further include a plurality of fingers, with the fingers of the stationary electrostatic arm being interdigitated with the fingers of the moveable electrostatic arm. The rotary electrostatic actuator preferably further includes at least one stop to prevent contact between the moveable electrostatic arm and the stationary electrostatic arm in each pair of electrostatic arms. The moveable electrostatic arms can be interconnected and supported by a frame which can also be used to support each pawl. Each pawl can be oriented to engage the indexing teeth and incrementally rotate the ring gear either upon application of the voltage to the rotary electrostatic actuator, or upon removal of the voltage from the rotary electrostatic actuator. Finally, the rotary electrostatic actuator can optionally include an electrostatic shield located between the stationary electrostatic arm of one pair of the plurality of electrostatic arms and the moveable electrostatic arm of an adjacent pair of the plurality of electrostatic arms.

The present invention also relates to a microelectromechanical (MEM) apparatus formed on a substrate and comprising a ring gear rotatable about an axis, with the ring gear having a plurality of indexing teeth spaced about an inner circumference thereof and a plurality of drive teeth spaced about an outer circumference thereof; a rotary thermal actuator formed within the inner circumference of the ring gear and further comprising a plurality of pairs of thermal arms spaced about the axis and extending outward therefrom, with each pair of thermal arms including a hot arm and a cold arm interconnected at an end of each hot arm located distally to the axis, the hot arm thermally expanding to a greater extent than the cold arm in response to a voltage applied across each pair of hot and cold arms, thereby incrementally rotating each pair of thermal arms about the axis; and at least one pawl operatively connected to each pair of thermal arms and engageable with the ring gear to incrementally rotate the ring gear upon application or removal of the applied voltage. In these embodiments of the present invention, one or more of the substrate, the ring gear, and the pairs of thermal arms preferably comprises polysilicon.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
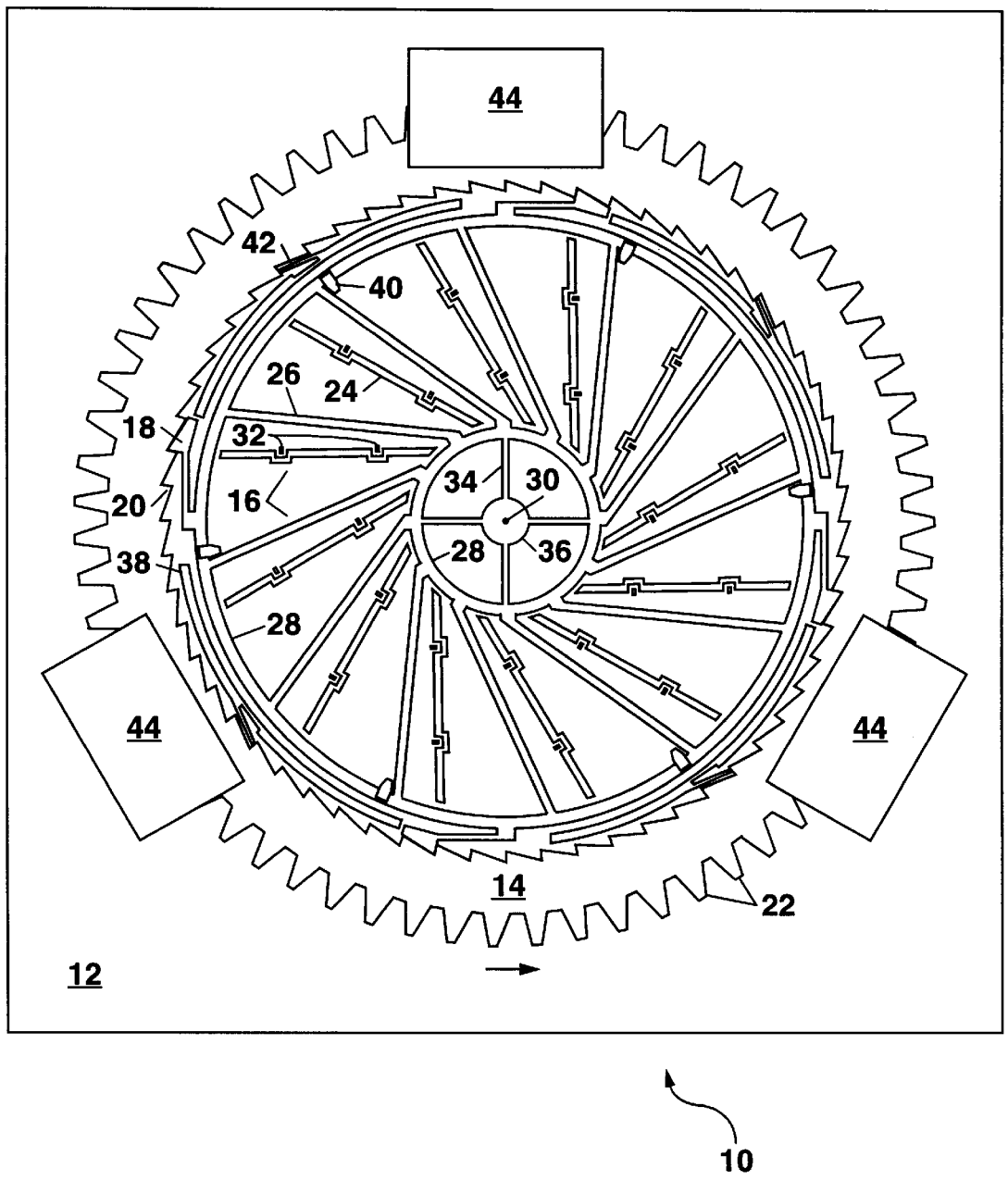
FIG. 1 shows a schematic plan view of a first example of a MEM ratcheting apparatus according to the present invention.

Referring to FIG. 1, there is shown schematically a first example of a MEM ratcheting apparatus 10 formed on a substrate 12 according to the present invention. In FIG. 1, the MEM apparatus 10 comprises a moveable member in the form of ring gear 14 which is moveable about a curved path (e.g. a circular path in the counterclockwise direction as indicated by the arrow in FIG. 1), a capacitive-plate electrostatic actuator 16 providing a back and forth (i.e. reciprocating) motion substantially in the direction of the path, and a plurality of ratchet pawls 18 operatively connected to the electrostatic actuator 16 and engageable with a plurality of indexing teeth 20 of the ring gear 14 to incrementally rotate the gear 14 along the curved path. The ring gear 14 further comprises a plurality of drive teeth 22 which can be used to drive other gears or a load when the MEM ratcheting apparatus 10 is used as a motive source (i.e. a motor). The ring gear can have a diameter of, for example, 0.3–5 millimeters; and the spacing of the indexing teeth 20 can be, for example, 2–20 $\mu$m.

The MEM apparatus 10 in the example of FIG. 1 can be formed on the substrate 12 which generally comprises silicon by using surface micromachining processes as known to the art. These surface micromachining processes are based on repeated steps for depositing and photolithographically patterning a plurality of alternating layers of polycrystalline silicon (also termed polysilicon) and a sacrificial material (e.g. silicon dioxide or a silicate glass) to build up the structure of the MEM apparatus 10 layer by layer, thereby forming the various elements and features of the structure of the MEM apparatus 10 in FIG. 1.

Altogether, four layers or levels of polysilicon are used to form both structural and non-structural elements of each example of the MEM apparatus 10 described herein. Additional levels of polysilicon allow the fabrication of MEM devices of added complexity so that with more than four levels of polysilicon it should be possible to form other embodiments of the present invention in the form of multiple stacked MEM devices 10 to either provide incremental rotation of a pair of stacked ring gears 14 in the same or different directions, or alternately to rotate a single ring gear in each of two selectable directions (e.g. counterclockwise rotation of a ring gear 14 upon activation of a first electrostatic actuator 16 formed in a first plurality of polysilicon layers, and clockwise rotation of the same ring gear 14 upon activation of a second electrostatic actuator 16' formed in a second plurality of polysilicon layers).

In the example of FIG. 1, the capacitive-plate electrostatic actuator 16 comprises a plurality of pairs of electrostatic arms, with each pair of the electrostatic arms comprising a stationary electrostatic arm 24 and a moveable electrostatic arm 26. A plurality of moveable electrostatic arms 26 can be supported at each end thereof by a common frame 28 comprising one or more concentric rings so that these arms 26 can move in unison upon activation of the electrostatic actuator 16 by a voltage applied across each pair of electrostatic arms 24 and 26.

In FIG. 1, the stationary and moveable electrostatic arms, 24 and 26, extend radially outward from a central axis 30 about which the ring gear 14 rotates. To provide an increased range of movement for the ganged arms 26, both the stationary and moveable electrostatic arms, 24 and 26, can be angled as shown in FIG. 1. Furthermore, each pair of the arms 24 and 26 can be oriented with respect to each other so that there is an angle of generally less than 20° therebetween, with the exact angle being determined by a desired range of incremental rotation of the moveable electrostatic arms 26 about the axis 30 as the arms 26 move forward from a rest position engaging a selected tooth 20 to urge the ring gear 14 along the curved path, and subsequently gliding backward over one or more indexing teeth 20 to reach the rest position again.

In a rest position in which the various elements of the MEM ratcheting apparatus 10 are initially fabricated prior to the application of any actuating voltage, the distance between the stationary and moveable electrostatic combs can range, for example, from 3 $\mu$m nearest the axis 30 to 13 $\mu$m furtherest from the axis 30 for a device 10 having an overall diameter of 820 $\mu$m and an inner diameter of 640 $\mu$m about which the indexing teeth 20 are spaced. Upon rotation of the moveable electrostatic arms 26, the angle between these arms 26 and the stationary arms 24 closes so that at the position of one or more forward stops 32 the arms 24 and 26 in each pair are substantially parallel to each other.

The MEM apparatus 10 of FIG. 1 can be electrically activated by momentarily providing a predetermined voltage (e.g. 20–100 volts) between the stationary and moveable electrostatic arms 24 and 26 which form substantially planar capacitor plates. This voltage generates an electrostatic force of attraction between the capacitor plates that acts to urge the moveable electrostatic arms 26 into contact with the stationary electrostatic arms 24, with the electrostatic force increasing inversely as the square of the distance between the arms 24 and 26. The forward stops 32 inset along the stationary electrostatic arms 24 are effectively electrically insulating (e.g. formed from a non-conducting material such as silicon nitride, or alternately electrically isolated from the stationary arms 24 and maintained at the same electrical potential as the moveable arms 26) and provide a minimum gap of, for example, 0.5 $\mu$m to prevent contact between the arms 24 and 26 which can otherwise result in an electrical short circuit.

The rotation of the moveable electrostatic arms 26 and support frame 28 in response to the applied voltage moves each pawl 18 attached to the support frame 28, thereby engaging each pawl 18 with an indexing tooth 20 to incrementally rotate the ring gear 14. Additionally, the incremental rotation of the moveable electrostatic arms 26 acts to bend a plurality of torsional restoring springs 34 which are attached at one end to an inner ring of the support frame 28 and at the other end to a hub 36 which is attached to the substrate 12. Upon removal of the applied voltage from the electrostatic actuator 16, the restoring springs 34 act to return the moveable electrostatic arms 26 and the pawls 18 to their rest position, with the pawls 18 sliding across one or more indexing teeth 20 and preferably coming to rest in the as-fabricated position shown in FIG. 1.

Repeated application of the voltage to the capacitive-plate electrostatic actuator 16 in FIG. 1 can be provided using an electrical signal having a cyclic waveform (e.g. a square-wave, triangular-wave or sinusoidal signal) of continuous or known duration. This will produce a reciprocating motion for the moveable electrostatic arms 26 and the pawls 18 to incrementally ratchet the ring gear 14 around its curved path at a predetermined speed, or alternately to rotate the ring gear 14 over a precise angle which can be accurately determined from the number of cycles of the applied voltage waveform. When a cyclic-waveform signal is used to drive any of the electrostatic actuators 16 described herein, it will be understood that any reference to the application of a voltage to the actuator 16 will include an increase in the cyclic-waveform signal from a "low" voltage level (i.e. a below threshold voltage level) which is insufficient to move the pawls 18 and rotate the ring gear 14 to a "high" voltage level (i.e. an above threshold voltage level) which is sufficient for motion of the pawls 18 and ring gear 14; and any reference to the removal of the voltage from the electrostatic actuator 16 will include a decrease in the cyclic-waveform signal from the "high" voltage level to the "low" voltage level (i.e. to below the threshold voltage level). Thus, removal of the voltage from the MEM apparatus 10 need not entail disconnecting the voltage from the device 10, but can simply entail a change in the level of the applied voltage.

By locating the various elements of the MEM ratcheting apparatus 10 symmetrically about the axis 30 as shown in FIG. 1 and by generating actuation forces which are directed tangentially to the indexing teeth 20 or in the direction of the curved path, the actuation forces can be balanced symmetrically about the MEM device 10. This is advantageous for improving the lifetime and reliability of the MEM device 10 as compared to other types of devices having unbalanced actuation forces.

In the first example of the present invention in FIG. 1, additional stops formed on the substrate 12 can be provided to limit the forward and backward motion of the moveable electrostatic arms 26 and the pawls 18. Such stops as shown schematically in FIG. 1 can include a plurality of arcuate pawl stops 38 which limit forward and backward motion of each pawl 18, and a plurality of reverse stops 40 which limit excessive backward motion of the moveable electrostatic arms 26. The pawl stops 38 can also serve to limit any lateral movement of the ring gear 14 other than rotation about the axis 30. In other embodiments of the present invention, the ring gear 14 can ride upon a curved track to control its lateral movement. Additionally, the pawl stops 38 can include an anti-reverse mechanism 42 to intercept one or more of the indexing teeth 20 to prevent any reversal in the direction of motion of the ring gear 14 due to friction of the pawls 18 in sliding across the indexing teeth 20 as the moveable electrostatic arms 26 are returned to their rest position upon removal of the applied voltage.

In FIG. 1, the reverse stops 40 can extend upward from the substrate 12 to limit any reverse motion of the moveable electrostatic arms 26 beyond the rest position. Additionally, the reverse stops 40 can extend laterally over the frame 28 to limit any vertical movement or play in the frame 28 and moveable electrostatic arms 26 since these elements are attached to the substrate 12 only through the restoring springs 34 and hub 36. A plurality of standoff tabs 44 are also preferably provided to control and limit vertical play or wobbling in the ring gear 14 to provide for proper meshing with additional gears (see FIG. 4) to be driven by rotation of ring gear 14.

Since the electrostatic force produced by the electrostatic actuator 16 varies inversely as the square of the distance between the stationary and moveable electrostatic arms 24 and 26, in some embodiments of the present invention it may be preferable to use the tensioned restoring springs 34 to directly drive the ring gear 14. This can be done by reversing the orientation of the pawls 18 and the indexing teeth 20 from that shown in the example of FIG. 1 so that the pawls 18 slide across the indexing teeth 20 upon application of the voltage to the electrostatic actuator 16 and positively engage and move the indexing teeth 20 under power of the tensioned restoring springs 34 when the voltage is removed from the electrostatic actuator 16. The use of the tensioned restoring springs 34 to directly drive the ring gear 14 can be advantageous since the springs 34 produce a force which varies linearly with displacement, thereby providing a linearly varying output torque to any load driven by the ring gear 14, with the torque being highest at a time when motion of the driving pawls 18 and driven ring gear 14 is first initiated. This is in contrast to the force and torque provided by a capacitive-plate electrostatic actuator 16 as shown in FIG. 1 which is initially small due to an inverse square dependence on the distance between the stationary and moveable arms 24 and 26.

Figure 2:
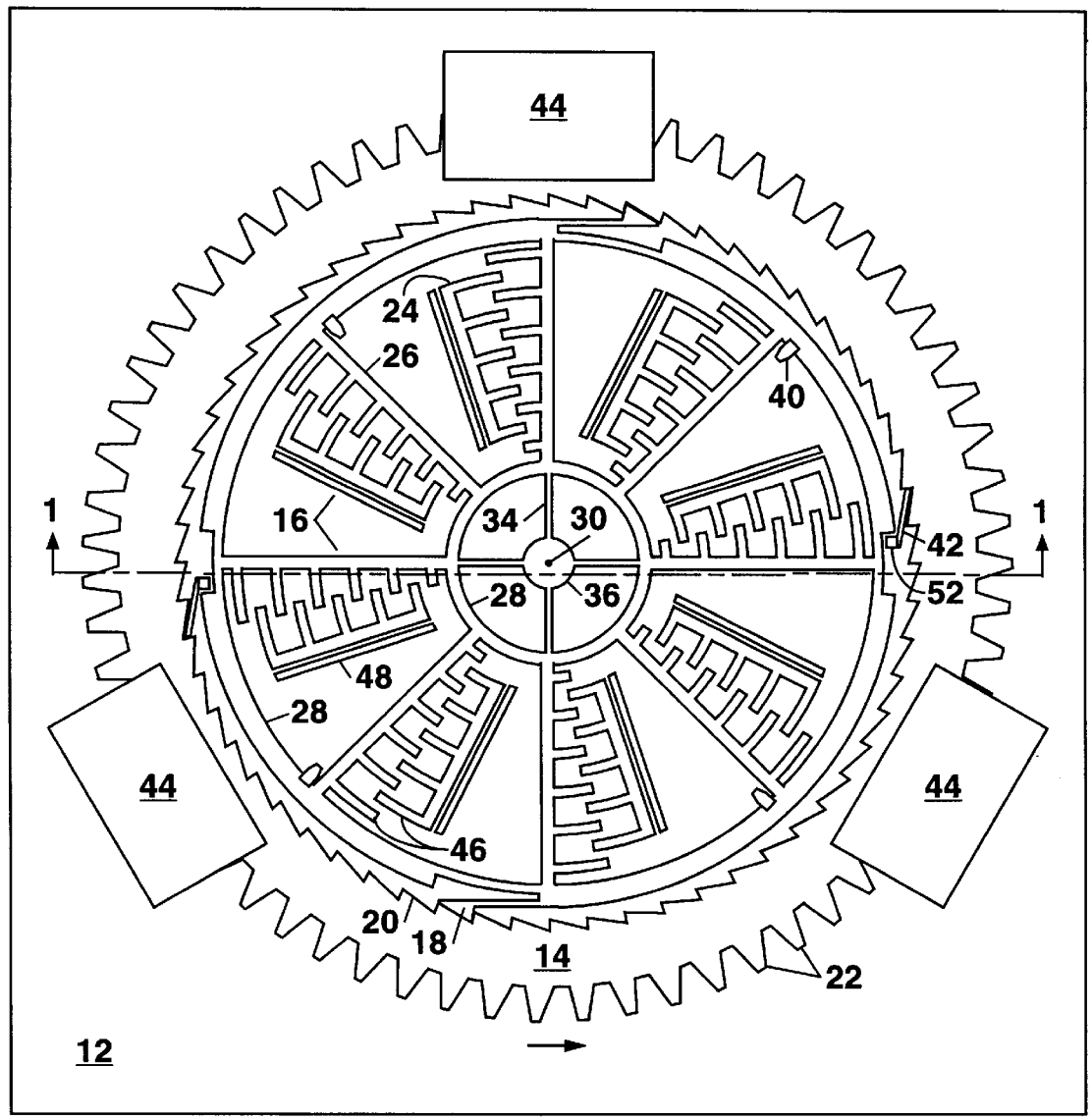
FIG. 2 shows a schematic plan view of a second example of a MEM ratcheting apparatus according to the present invention.

FIG. 2 shows a second example of the MEM ratcheting apparatus 10 of the present invention. The apparatus 10 of FIG. 2, which is shown in a rest position prior to actuation, is similar to the device of FIG. 1 except that each pair of electrostatic arms 24 and 26 is based on interdigitated electrostatic combs formed by a plurality of spaced fingers 46 extending outward from each arm 24 and 26 toward the other arm of a particular pair, with the fingers 46 of a moveable electrostatic arm 26 being at least partially enmeshed with the fingers 46 of a corresponding stationary arm 24. Such an arrangement of interdigitated fingers forms an electrostatic comb actuator 16. The fingers 46 are preferably curved to maintain an equidistant spacing (e.g. 2.5 μm) between the fingers of the stationary and moveable electrostatic arms 24 and 26, and have a length that increases with radial distance from the axis 30. In the example of FIG. 2, the number of fingers 46 has been limited for clarity, with an actual electrostatic comb actuator 16 generally comprising many more active fingers 46 and pairs of electrostatic arms 24 and 26 than shown in FIG. 2 (e.g. a total of 480 active fingers and 50 pairs of electrostatic arms 24 and 26 arranged in two concentric rows for an 820-μm diameter device 10). The number of active fingers 46 in the electrostatic comb actuator 16 is generally approximately equal to one-half the total number of fingers on both the stationary and moveable electrostatic arms 24 and 26.

An advantage of the MEM apparatus 10 of FIG. 2 is that an electrostatic force of attraction produced when a voltage is applied across each pair of stationary and moveable electrostatic arms 24 and 26 is substantially constant, independent of the angular motion of the moveable electrostatic arm 26. This is in contrast to the capacitive-plate electrostatic actuator 16 in FIG. 1 which produces an electrostatic force of attraction which varies inversely as the square of the distance between the stationary and moveable electrostatic arms 24 and 26. Thus, an electrostatic comb actuator 16 as shown in FIG. 2 can provide a larger start-up torque to initiate movement of the ratchet pawls 18 and ring gear 14 than may be possible with an equivalent-sized device 10 using a capacitive-plate electrostatic actuator 16.

In the example of FIG. 2, an electrostatic shield 48 can be provided proximate to each stationary electrostatic arm 24 as shown to reduce an unwanted electrostatic force of attraction between that arm 24 and a moveable electrostatic arm 26 of an adjacent pair of arms 24 and 26. The electrostatic shield 48 is preferably maintained at a ground electrical potential as is each moveable electrostatic arm 26. This can be done by building up the electrostatic shield 48 from a ground-plane portion of a Poly-0 layer 50 as described hereinafter that overlies the substrate 12 underneath the electrostatic actuator 16.

In the second example of the present invention in FIG. 2, a plurality of frame stops 52 are substituted for the pawl stops 38 used in the first example of the MEM device 10 in FIG. 1. Each frame stop 52 in FIG. 2 is built up from the substrate 12 within a notched region of the frame 28, and acts to arrest motion of the frame 28 upon reaching a predetermined range of forward or reverse motion of the moveable electrostatic arms 26. This prevents excessive forward motion of the moveable electrostatic arms 26 which could otherwise contact the stationary electrostatic arms 24 and generate an electrical short circuit. It also prevents excessive reverse motion of the moveable electrostatic arms 26 which could otherwise disengage the fingers 46 upon removal of the applied voltage.

Rotation of the ring gear 14 in FIG. 2 can be accomplished as described previously by applying a cyclic voltage signal to the electrostatic actuator 16 to repetitively move the pawls 18 back and forth, with each repeated movement of the pawls 18 engaging the indexing teeth 20 to move the ring gear 14 along its curved path. An anti-reverse mechanism 42, which generally comprises a plurality of tangs formed on the substrate 12 or attached to the frame stops 52 as shown in FIG. 2, extends outward to engage the indexing teeth 20 thereby preventing backward rotation of the ring gear 14 each time the moveable electrostatic arms 26 are returned to their rest position by the action of restoring springs 34.

Figure 3:
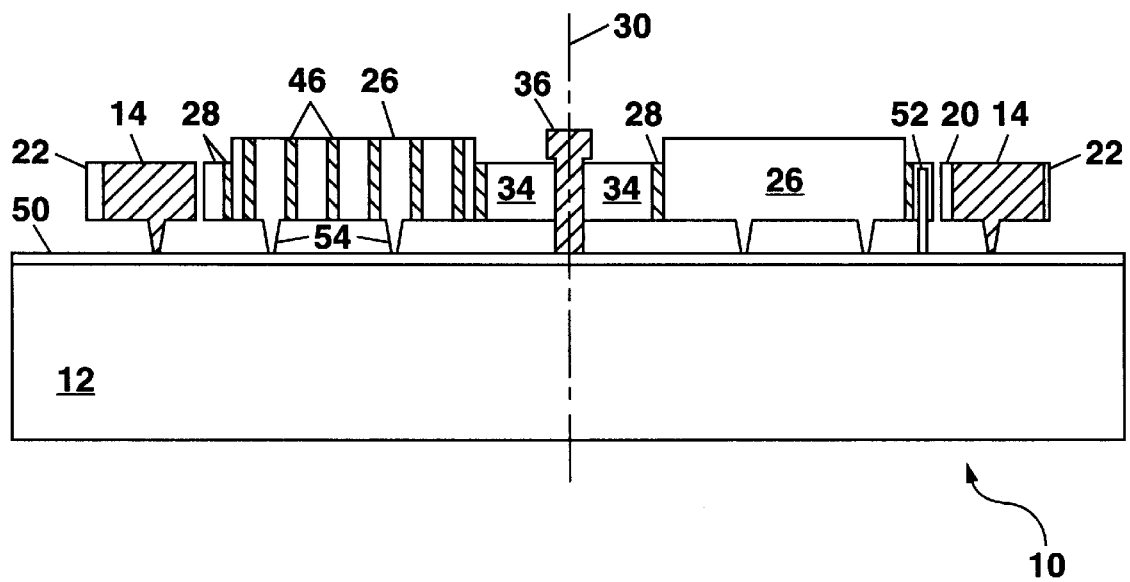
FIG. 3 shows a schematic cross-section view of the device of FIG. 2 along the section line 1—1.

FIG. 3 shows a schematic cross-section view through the section line 1—1 in FIG. 2 to illustrate build-up of the MEM ratcheting apparatus 10 by conventional surface micromachining processes. The surface micromachining processes are based on conventional IC processing steps, including material deposition, photolithography, masking, etching, mask stripping, and cleaning. Up to hundreds of individual process steps can be used to form the completed structure of the MEM ratcheting apparatus 10 based on repeated deposition and patterning of alternating layers of polycrystalline silicon (also termed polysilicon) and a sacrificial material (e.g. silicon dioxide or a silicate glass), with the MEM apparatus 10 being built up layer by layer. In a preferred process for forming the MEM apparatus 10, four layers or levels of polysilicon are used. The term "patterning" as used herein refers to a sequence of well-known semiconductor integrated circuit processing steps including applying a photoresist to the substrate 12, prebaking the photoresist, aligning the substrate 12 with a photomask, exposing the photoresist through the photomask, developing the photoresist, baking the photoresist, etching away the surfaces not protected by the photoresist, and stripping the protected areas of the photoresist so that further processing can take place. The term "patterning" can further include the formation of a hard mask (e.g. comprising about 500 nanometers of a silicate glass deposited from the decomposition of tetraethylortho silicate, also termed TEOS, by low-pressure chemical vapor deposition at about 750° C. and densified by a high temperature processing) overlying a polysilicon or sacrificial material layer in preparation for defining features into the layer by anisotropic dry etching (e.g. reactive ion etching).

A silicon substrate 12 is preferably used for supporting the MEM apparatus 10. The silicon substrate 12 can be initially prepared for fabrication of the MEM apparatus 10 by blanketing the substrate 12 with a layer of a thermal oxide (e.g. 630 nanometers thick) formed by a conventional wet oxidation process at an elevated temperature (e.g 1050° C. for about 1.5 hours). A layer of low-stress silicon nitride (e.g. 800 nanometers thick) can then be deposited over the thermal oxide layer using low-pressure chemical vapor deposition (LPCVD) at about 850° C. The thermal oxide and silicon nitride layers (not shown in FIG. 3) provide electrical isolation from the substrate 12 for subsequently-deposited polysilicon layers which are used to build up various elements of the MEM apparatus 10 and to provide electrical connections to the electrostatic actuator 16.

The MEM ratcheting apparatus 10 is built up on the substrate 12 using chemical vapor deposition (CVD) to alternately deposit layers of polysilicon and a sacrificial material such as silicon dioxide or a silicate glass (e.g. a plasma-enhanced CVD oxide, also termed PECVD oxide; or a silicate glass such as TEOS). Each deposited layer of polysilicon or sacrificial material can be patterned using a photolithographically-defined mask and etching (e.g. reactive ion etching). Once patterned, each polysilicon or sacrificial material layer can serve as a mold to define features in a subsequently-deposited layer. Each subsequently-deposited polysilicon layer (i.e. Poly-1, Poly-2 and Poly-3) can be annealed at a temperature of about 1100° C. for about 3 hours to relieve stress therein prior to photolithographically defining that layer. This minimizes mechanical stress which otherwise might distort elements of the MEM ratcheting apparatus 10 such as the ring gear 14 and electrostatic actuator 16 upon release of the MEM apparatus 10 by etching away the sacrificial layers, or which might otherwise result in an excessive build-up of stress which can bow the substrate 12.

In FIG. 3, a first polysilicon layer 50 (termed Poly-0) is used to form a ground plane which underlies the electrostatic actuator 16 and is electrically connected to the moveable electrostatic arms 26 through the hub 36 and the restoring springs 34. A portion of the Poly-0 layer 50 is patterned for electrical isolation and used to form an electrical connection to each stationary electrostatic arm 24, including a base upon which each arm 24 is built. The Poly-0 layer 50, with a thickness of about 300 nanometers, can be blanket deposited over the substrate 12 by LPCVD at a temperature of about 580° C. All subsequent polysilicon depositions can also be performed at this same temperature using LPCVD, with each subsequent polysilicon layer generally being about 1–3 $\mu$m thick. Phosphorous doping can be used to make the Poly-0 layer 50 and the overlying polysilicon layers electrically conductive as needed. One or more vias can be formed through the underlying thermal oxide and silicon nitride layers so that the Poly-0 layer 50 can be electrically connected to the substrate 12 which is also generally held at ground electrical potential.

The various polysilicon layers are separated by deposited and patterned layers of the sacrificial material which are generally of comparable thickness to the polysilicon layers. Chemical-mechanical polishing (CMP) can be used to planarize each polysilicon or sacrificial layer as needed, or to precisely adjust the thickness of a particular layer. In FIG. 3, the layers of sacrificial material have been removed by an etch release step to free the MEM ratcheting apparatus 10 for operation so that these layers are not shown in the completed device 10.

A first sacrificial layer is deposited over the Poly-0 layer 50 and patterned to form openings extending partway through the first sacrificial layer at the locations of a plurality of dimples 54 to be formed in the ring gear 14, and in the moveable electrostatic arms 26. The dimples 54, which are formed by subsequently depositing of an overlying polysilicon layer (termed Poly-1) to fill in the openings in the first sacrificial layer, limit frictional contact of the ring gear 14 and the moveable electrostatic arms 26 with the underlying Poly-0 layer 50 as these elements move. If necessary to prevent the possibility of an electrical short circuit, a thin insulating layer (e.g. silicon nitride) can be formed over the Poly-0 layer 50 at locations contacted by the dimples 54 during operation of the MEM ratcheting apparatus 10.

Additional openings can also be formed completely through the first-deposited sacrificial layer at the locations of various elements including the hub 36, stationary electrostatic arms 24, electrostatic shields 48, standoff tabs 44, and the various stops 32, 38, 40 and 52 which are built-up directly on the Poly-0 layer 50. In some instances, these elements (e.g. the stationary electrostatic arms 24) are formed on electrically isolated portions of the Poly-0 layer 50.

To build up the structure of the MEM ratcheting apparatus 10, the polysilicon or sacrificial layer deposition, photolithography, and etching process steps are repeated multiple times. The MEM apparatus 10 can then be released for operation by selectively etching away the various sacrificial layers using a selective etchant comprising hydrofluoric acid (HF) that does not substantially attack the polysilicon layers. For this purpose, a plurality of access holes (see FIG. 4) are generally formed through the polysilicon layers at various locations to expose the underlying sacrificial layer(s) to the selective etchant. After release, all the sacrificial layers are generally removed to leave the interconnected polysilicon layers which form the MEM apparatus 10.

In the example of FIGS. 2 and 3, the hub 36 can be formed on the Poly-0 layer 50 using a second polysilicon layer (termed Poly-1) and a third polysilicon layer (termed Poly-2) to provide an overall thickness for the hub 36 of about 4.5 $\mu$m above the Poly-0 layer 50, with this thickness including encapsulated portions of two layers of sacrificial material (not shown in FIG. 3). The restoring springs 34 and support frame 28 can also be formed from the Poly-1 and Poly-2 layers, but are cantilevered from the hub 36 above the Poly-0 layer 50. The restoring springs 34 can each be about 1.5–2 $\mu$m wide. The ring gear 14, pawls 18, anti-reverse mechanism 42 and frame stops 52 can similarly be formed from the Poly-1 and Poly-2 layers. The frame stops 52 are built up on the Poly-0 layer 50; whereas the ring gear 14 is initially separated from the Poly-0 layer 50 by a 2-$\mu$m-thick layer of sacrificial material which is removed during the etch release step so that the ring gear 14 is rotatable over the Poly-0 layer 50 on dimples 54. One or more dimples 54 can also be formed underneath each pawl 18. A fourth polysilicon layer (termed Poly-3) about 1–2 $\mu$m thick can optionally be used to stiffen the ring gear 14 (e.g. by forming one or more arcuate ribs from the Poly-3 layer to overlie the ring gear 14 as shown in FIGS. 4 and 5).

In FIGS. 2 and 3, the stationary and moveable electrostatic arms 24 and 26 can be formed from the Poly-1, Poly-2 and Poly-3 layers to increase the overall height of the fingers 46 to about 4–5 $\mu$m and thus increase the electrostatic force of attraction which varies linearly with the height of the fingers 46. The stationary electrostatic arms 24 are built up on an electrically isolated portion of the Poly-0 layer 50; whereas the moveable electrostatic arms 26 are suspended above a ground-plane portion of the Poly-0 layer 50 prior to the etch release step. After release, the moveable electrostatic arms 26 can slide over the Poly-0 layer 50 with contact limited by the dimples 54.

Although not shown in FIG. 3, the reverse stops 40 and the standoff tabs 44 can also be built-up from the Poly-1, Poly-2 and Poly-3 layers. Each standoff tab 44 preferably includes one or more dimples 54 extending downward over the ring gear 14 to reduce frictional contact with the ring gear 14.

Figure 4:
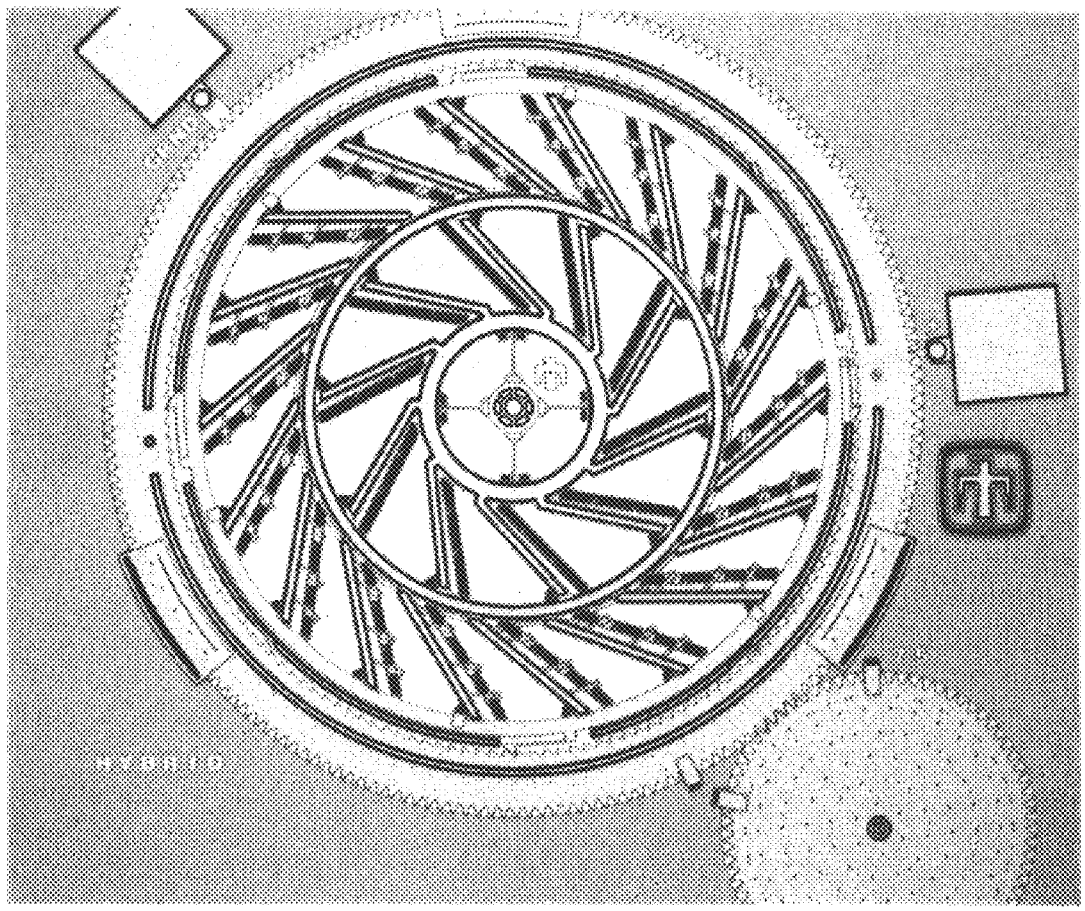
FIG. 4 shows an image of a third example of a MEM ratcheting apparatus according to the present invention.
Figure 5:
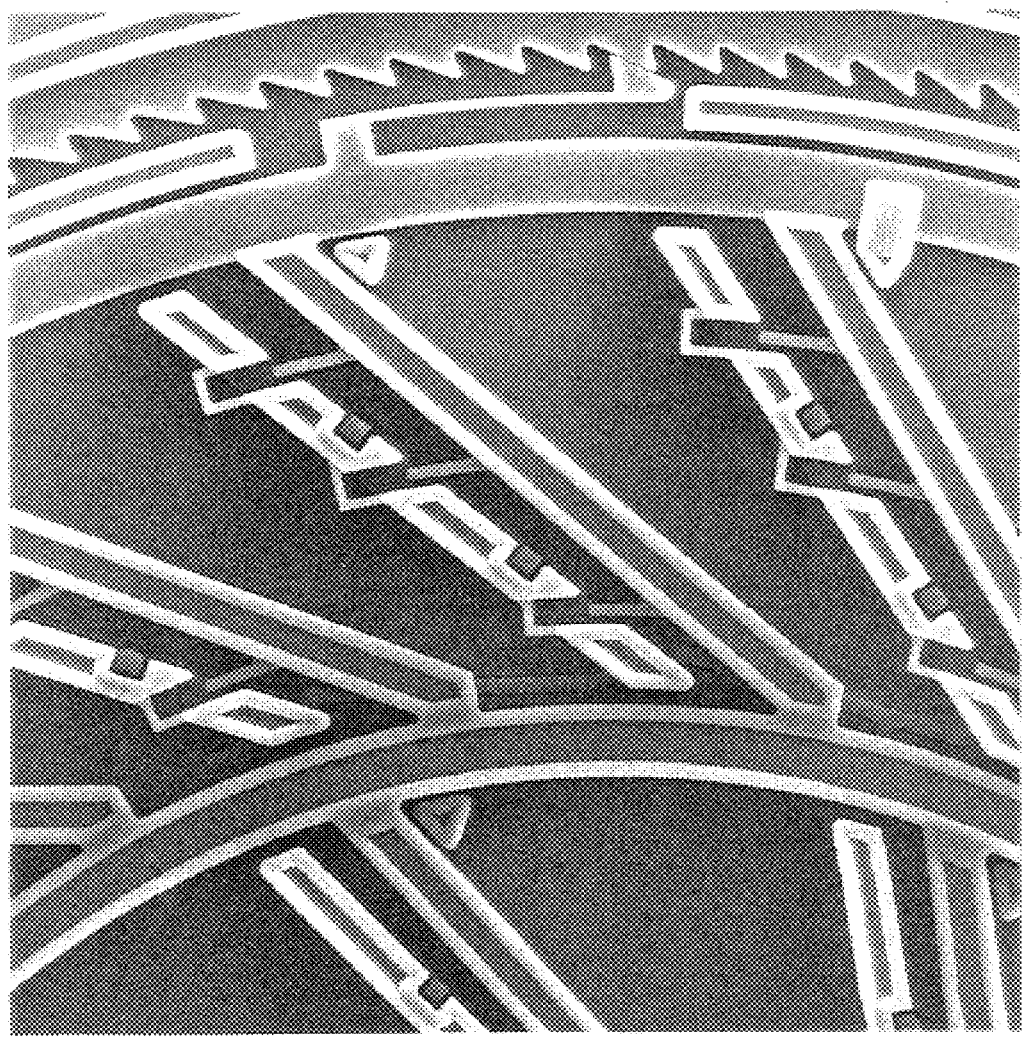
FIG. 5 shows an enlarged view of a portion of the device in FIG. 4.

FIG. 4, which is a photographic image taken after device fabrication, and FIG. 5, which is a scanning electron microscope (SEM) image showing elements of FIG. 4 in greater detail, depict a third example of the present invention in the form of a hybrid MEM ratcheting actuator 10. This hybrid MEM actuator 10 combines concepts from each of the first and second examples of the present invention. This third example of the MEM actuator 10 is designed similar to the first example of FIG. 1 except that two concentric rows of stationary and moveable electrostatic arms 24 and 26 are used. Additionally, an outer row of the moveable electrostatic arms 26 in FIG. 4 includes a plurality of angled or curved fingers 46 to provide an increased initial electrostatic force of attraction to initiate movement of the arms 26 upon application of an actuating voltage. These fingers 46, which are shown in greater detail in the SEM partial view of FIG. 5, are engaged with a plurality of slots formed in the stationary electrostatic arms 24 which are substantially equivalent to the fingers 46 on the arms 24 in FIG. 2. The MEM device 10 of FIGS. 4 and 5 has an overall ring-gear diameter of 820 μm and is shown driving another smaller gear. Additionally, FIG. 4 shows a pair of square probe pads for making electrical connections to the electrostatic actuator 16.

Figure 6:
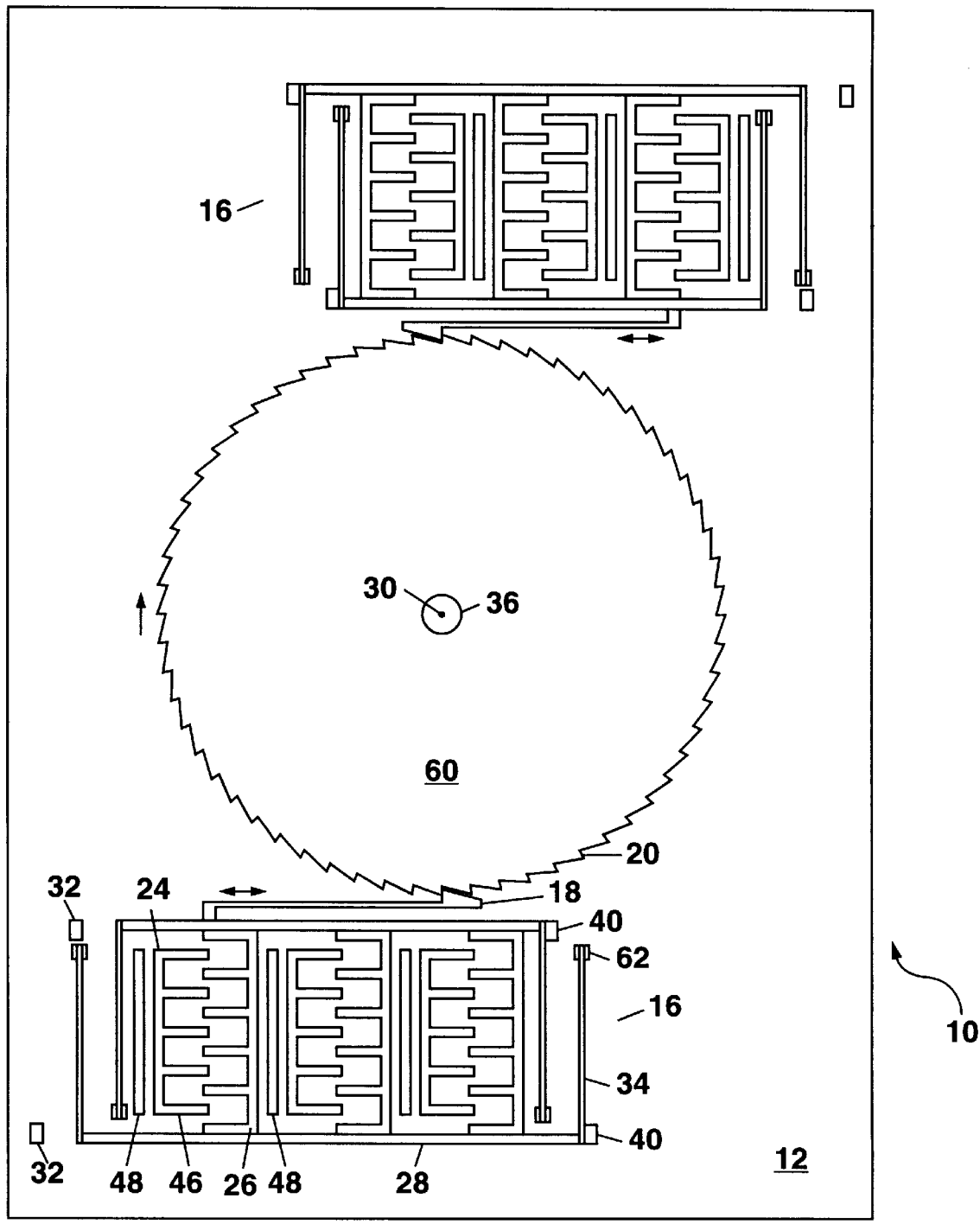
FIG. 6 shows a schematic plan view of a fourth example of a MEM ratcheting apparatus according to the present invention.

FIG. 6 schematically illustrates a fourth example of a MEM ratcheting apparatus 10 according to the present invention. This type of MEM device 10 shown in FIG. 6 is useful, for example, to rotate a stage 60 which can support a micromachined mirror or optical encoder (not shown) which can be used to reflect or encode an incident light beam (e.g. from a lamp, a light-emitting diode, or a laser). In the device 10 of FIG. 6, the stage 60 is mounted on a hub 36 for rotation about a circular path in a selected direction (e.g. clockwise as indicated by the single-headed arrow). The stage 60 includes a plurality of indexing teeth 20 arranged about its outer circumference, with the indexing teeth 20 being driven by one or more electrostatic actuators 16.

Each electrostatic actuator 16 can be either a comb actuator as shown in FIG. 6, or alternately a capacitive-plate electrostatic actuator as described previously with reference to FIG. 1, or a hybrid electrostatic actuator similar to that shown in FIGS. 4 and 5. Since the electrostatic actuator 16 in this example of the present invention is located outside the stage 60, the reciprocating motion of each electrostatic actuator 16 and pawl 18 can be along a straight line that is tangential to the circumference of the rotary stage 60. This tangential reciprocating motion is indicated in FIG. 6 by the double-headed arrows. A plurality of electrostatic actuators 16 situated symmetrically about an axis of rotation 30 for the stage 60 is advantageous for balancing any mechanical forces directed radially onto hub 36 to reduce wear on the hub 36 and thereby promote reliability for the MEM actuator 10.

In FIG. 6, each electrostatic actuator 16 comprises a plurality of pairs of stationary electrostatic arms 24 and moveable electrostatic arms 26, with each arm 24 and 26 further comprising a plurality of interdigitated fingers 46. The moveable electrostatic arms 26 are supported above the substrate 12 by a frame 28 comprising a pair of longitudinal beams, with each beam in the frame 28 being supported in turn by one end of a restoring spring 34. The other end of each restoring spring 34 is attached to the substrate 12 through a support pad 62 so that the restoring springs 34, frame 28 and moveable electrostatic arms 26 are all suspended above the substrate 12 for movement in response to a voltage applied between the stationary and moveable electrostatic arms 24 and 26.

In FIG. 6, electrostatic shields 48 maintained at ground electrical potential can be positioned between each stationary electrostatic arm 24 of a particular pair of interdigitated arms 24 and 26 and an adjacent moveable electrostatic arm 26 of another pair of arms 24 and 26 to substantially reduce an unwanted electrostatic force of attraction which is oppositely directed from the electrostatic force produced by the interdigitated fingers 46. An additional electrostatic shield 48 located between a stationary electrostatic arm 24 and an adjacent restoring spring 34 can be used to prevent an unwanted electrostatic force of attraction between the arm 24 and the restoring spring 34.

In the example of FIG. 6, fabrication can proceed as described previously, with the stage 60 being formed from the Poly-1 and Poly-2 layers and optionally reinforced using the Poly-3 layer; and with the other elements of the MEM apparatus 10 generally being formed in the same layers as their counterparts as described with reference to FIG. 3.

The two electrostatic actuators 16 in the example of the present invention in FIG. 6 can be driven in-phase with a cyclic voltage signal to rotate the stage 60 in the clockwise direction over a predetermined angle. An anti-reverse mechanism can optionally be used to prevent any counter-clockwise motion of the stage 60 as the pawls 18 slide across the indexing teeth 20 after each pulling stroke of the actuators 16. In other embodiments of the present invention, the two electrostatic actuators 16 can be driven out-of-phase, alternately engaging the teeth 20 to incrementally rotate the stage 60. An out-of-phase drive arrangement can be advantageous since each actuator 16 need only have a stroke equal to about one-half the distance between adjacent indexing teeth 20.

Figure 7:
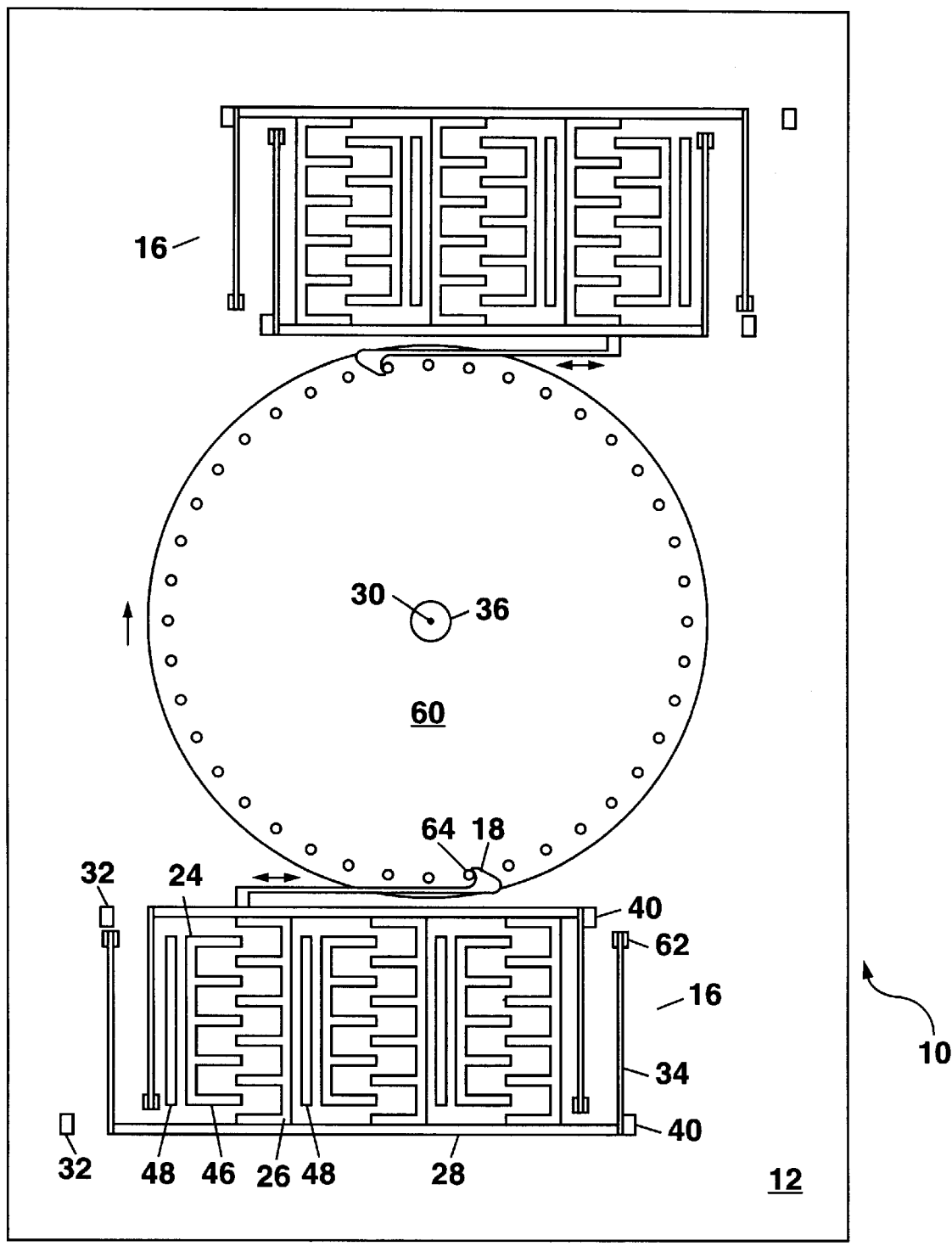
FIG. 7 shows a schematic plan view of a fifth example of a MEM ratcheting apparatus according to the present invention.

FIG. 7 schematically illustrates a fifth example of a MEM ratcheting apparatus 10 according to the present invention. The example of FIG. 7 is similar to that of FIG. 6 except the rotary stage 60 includes a plurality of indexing pins 64 extending outward from a surface or edge of the stage 60 as a substitute for the indexing teeth 20 used in the example of FIG. 6. Additionally, each pawl 18 can be shaped to provide a curved surface which engages one of the indexing pins 64 to incrementally rotate the stage 60 in response to reciprocating motion of each electrostatic actuator 16. In the example of FIG. 7 with the indexing pins 64 extending outward from the surface of the stage 60, the stage 60 can be formed, for example, in the Poly-1 and Poly-2 layers, with the indexing pins 64 and the pawls 18 being formed in the Poly-3 layer. Alternately, if the indexing pins 64 extend outward from an edge of the stage 60, the indexing pins 64 and the pawls 18 can be formed in the same layers used to form the stage 60 (e.g. the Poly-1 and Poly-2 layers).

An advantage of using the indexing pins 64 as a substitute for the indexing teeth 20 is that a contact area between a pawl 18 and pin 64 is much less when the pawl 18 rubs across a pin 64 prior to engaging that pin 64 than when a pawl 18 must rub past an indexing tooth 20 prior to engaging that indexing tooth. Minimizing the area of contact is advantageous since contact of rubbing elements can lead to seizure in a MEM device. In each of the embodiments of the present invention presented herein by way of example, those skilled in the art will understand that indexing pins 64 can be substituted for indexing teeth 20 with minor modification to the pawls 18. Such modifications can include changes to the shape of the pawls 18 and changes in the polysilicon layer(s) in which the pawls 18 are formed.

Figure 8:
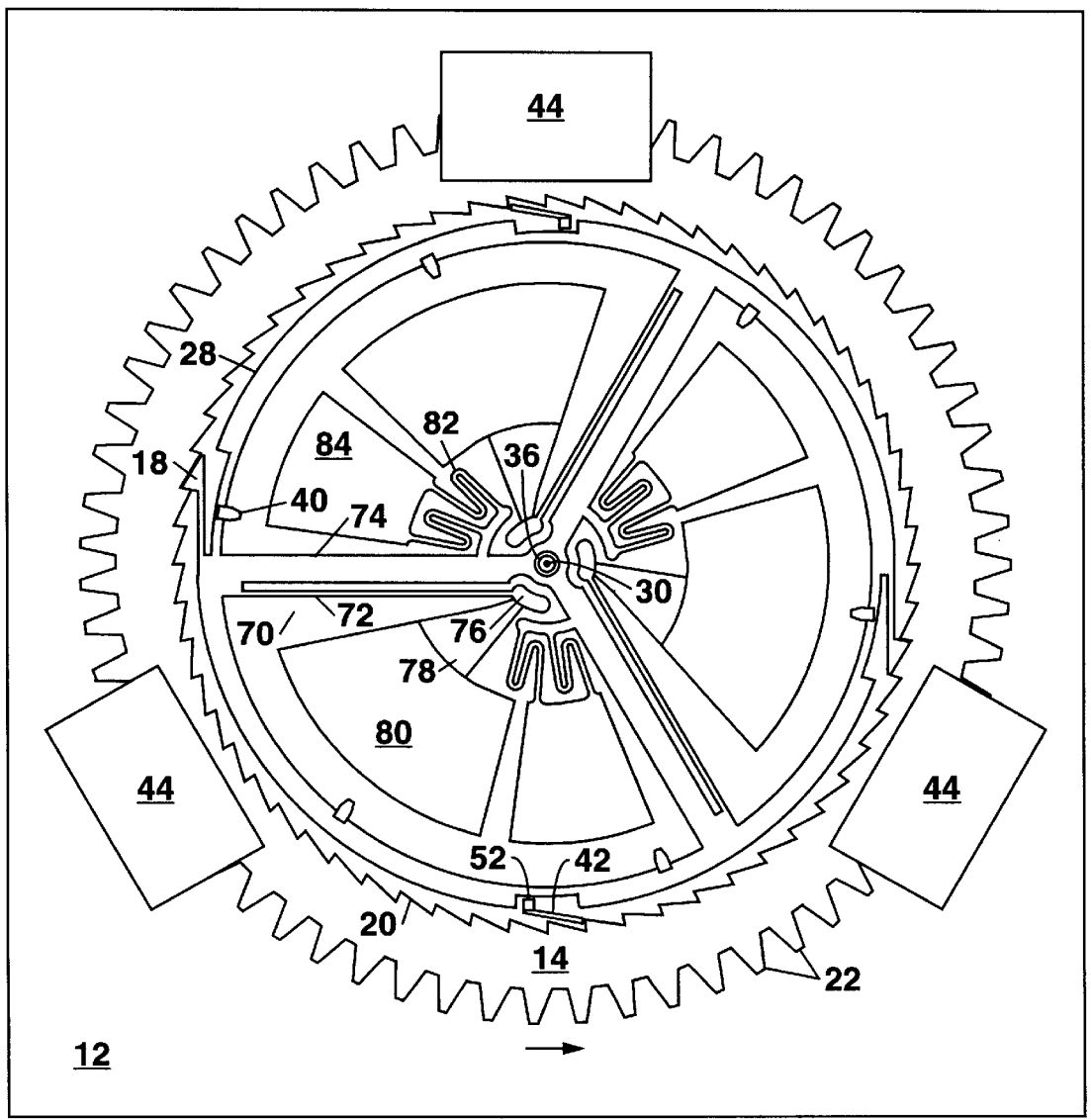
FIG. 8 shows a schematic plan view of a sixth example of a MEM ratcheting apparatus according to the present invention.

FIG. 8 shows an example of a MEM ratcheting apparatus 10 based on the use of a thermal actuator 70. In FIG. 8, the thermal actuator 70 comprises a plurality of pairs of thermal arms spaced about a central axis 30 and extending outward therefrom, with each pair of thermal arms including a hot arm 72 and a cold arm 74 interconnected at an end of each hot arm 72 located distally to the central axis 30. The hot and cold arms 72 and 74 are supported above the substrate 12, with the hot arm 72 being suspended outward from a hot arm support 76 which is electrically insulated from the substrate 12 and electrically connected to a low-resistance electrical conductor 78 and a first probe pad 80. The cold arm 74 is suspended from one end of one or more serpentine conductors 82 which are attached at the other end to a second probe pad 84. A hub 36 is located at the axis 30 primarily to prevent excessive lateral movement of the interconnected cold arms 74 during handling of the device 10. During operation of the MEM device 10, the cold arms 74, which are designed to be symmetrically balanced and spaced slightly away from the hub 36, are expected to incrementally rotate about the axis 30 without contacting the hub 36. One or more dimples 54 (not shown in FIG. 8) are also preferably provided on the hot and cold arms 72 and 74 and on the serpentine conductors 82 so that these elements can slidingly contact electrically-isolated regions of the Poly-0 layer 50 to reduce friction during movement, and also to reduce any sagging of the elements (e.g. the hot arms 72).

To operate the thermal actuator 70, a voltage (e.g. 5–10 volts) is applied across each pair of thermal arms 72 and 74, which are formed of doped polysilicon (e.g. one or more of the Poly-1, Poly-2 and Poly-3 layers), with the applied voltage being connected to the hot arm 72 via the low-resistance electrical conductor 78 and first probe pad 80 and to the cold arm 74 via the serpentine conductors 82 and the second probe pad 84 which is preferably maintained at ground electrical potential. The various hot arm supports 76 are preferably electrically interconnected (e.g. through wiring formed in the Poly-0 layer 50) so that the electrical power supplied to each hot arm 72 is substantially equal.

In the device 10 of FIG. 8, the applied voltage generates an electrical current in the resistive polysilicon which travels through the hot arm 72 and cold arm 74. The majority of the applied voltage is dropped across the hot arm 72, which has a smaller cross-sectional area and reduced electrical and thermal conductance in comparison with the cold arm 74, thereby heating the hot arm 72 to a temperature of several hundred ° C. above ambient (e.g. 400° C.) in a matter of a few milliseconds or less.

Upon application of the voltage to heat the hot arm 72, the hot arm 72 thermally expands relative to the cold arm 74 (e.g. by about 0.25 $\mu$m for a 250-$\mu$m-long polysilicon hot arm 72 for a 400° C. temperature rise above ambient), thereby acting as a compressed spring which forces the cold arm 74 to rotate several degrees in the backward (i.e. clockwise) direction about the axis 30 (e.g. about 30 of rotation for a 400° C. temperature rise). This rotation results from the hot arm 72 being connected to the hot arm support 76 at a position that is offset from the axis 30 about which the cold arm 74 is constrained to move. As the cold arm 74 rotates, it forces each pawl 18 connected to the cold arm 74 to slide backward across one or more indexing teeth 20. The serpentine conductors 82 connected to the cold arm 74 also flex and bend with motion of the cold arm 74. A reverse stop 40 can be used to limit the extent of rotation of the cold arm 74 upon heating of the hot arm 72.

This arrangement, in which the cold arm 74 rotates incrementally about the axis 30 instead of being firmly attached at one end and being required to flex, is efficient and minimizes energy loss due to deformation of the cold arm 74 which would otherwise be required. Furthermore, this arrangement allows a larger rotation angle since the energy which would otherwise be required to flex the cold arm 74 as a spring can be used instead for rotatation of the cold arm 74. Finally, this arrangement allows the cold arm 74 and attached frame 28 and pawls 18 to be maintained at a low voltage (e.g. a few tenths of a volt above ground electrical potential) relative to the grounded ring gear 14, thereby preventing any substantial current flow between the pawls 18 and the ring gear 14 which can be problematic and potentially lead to seizure of these elements.

Upon removal of the applied voltage, the hot arm 72 rapidly cools off, thereby thermally contracting the hot arm 72. This thermal contraction of the hot arm 72 produces a pulling effect on the attached end of the cold arm 74 to rotate the cold arm 74 and each pawl 18 in the forward (i.e. counterclockwise) direction to their rest positions, incrementally rotating the ring gear 14 in the forward direction.

The use of a cyclic applied voltage can repeatedly heat and cool the hot arm 72 to rotate the ring gear 14 in steps over a selected angle, or to continuously rotate the ring gear 14 at a selected speed. The use of a thermal actuator 70 as a substitution for the electrostatic actuator 16 can be advantageous when a higher rotation force is needed than can be provided electrostatically (e.g. for driving a relatively massive ring gear 14 or stage 60, or to overcome a resistive force from an external load). Additionally, the thermal actuator 70 can be operated at lower voltages than an equivalent electrostatic actuator 16, thereby simplifying interfacing the MEM ratcheting apparatus 10 with electronic drive circuitry (e.g. CMOS or bipolar integrated circuitry) which, in some instances, can be formed on the same substrate as the MEM apparatus 10. In a MEM actuator 10 having three pairs of thermal arms as shown in FIG. 8, about 25 milliwatts of peak electrical power (5 mA at 5 volts) is expected to be required to operate each pair of thermal arms to drive an 820-$\mu$m diameter ring gear 14.

The example of the present invention of FIG. 8 can be fabricated using the same surface micromachining processes as described heretofore, with the hot arm 72 being formed in the Poly-1, Poly-2 and Poly-3 layers or any combination thereof; and with the cold arm 74 generally being formed in the Poly-1, Poly-2 and Poly-3 layers. The hot arm supports 76 can be formed in the Poly-0, Poly-1 and Poly-2 layers. The serpentine conductors 82 can be formed in the Poly-1 and Poly-2 layers, with multiple serpentine conductors 82 being preferred since they can be made more compliant while at the same time having the same electrical conductance as a single serpentine conductor having a larger cross-sectional area. The low-resistance electrical conductor 78 can be formed with an increased cross-sectional area by etching a plurality of radially-oriented trenches into the electrically-insulating material underlying the Poly-0 layer so that the Poly-0 layer can drape into the trenches and form folds. Optionally, the Poly-1 layer can be similarly patterned to drape over the folded Poly-0 layer to further increase the cross-sectional area of the conductor 78 and thereby reduce its electrical resistance.

Figure 9:
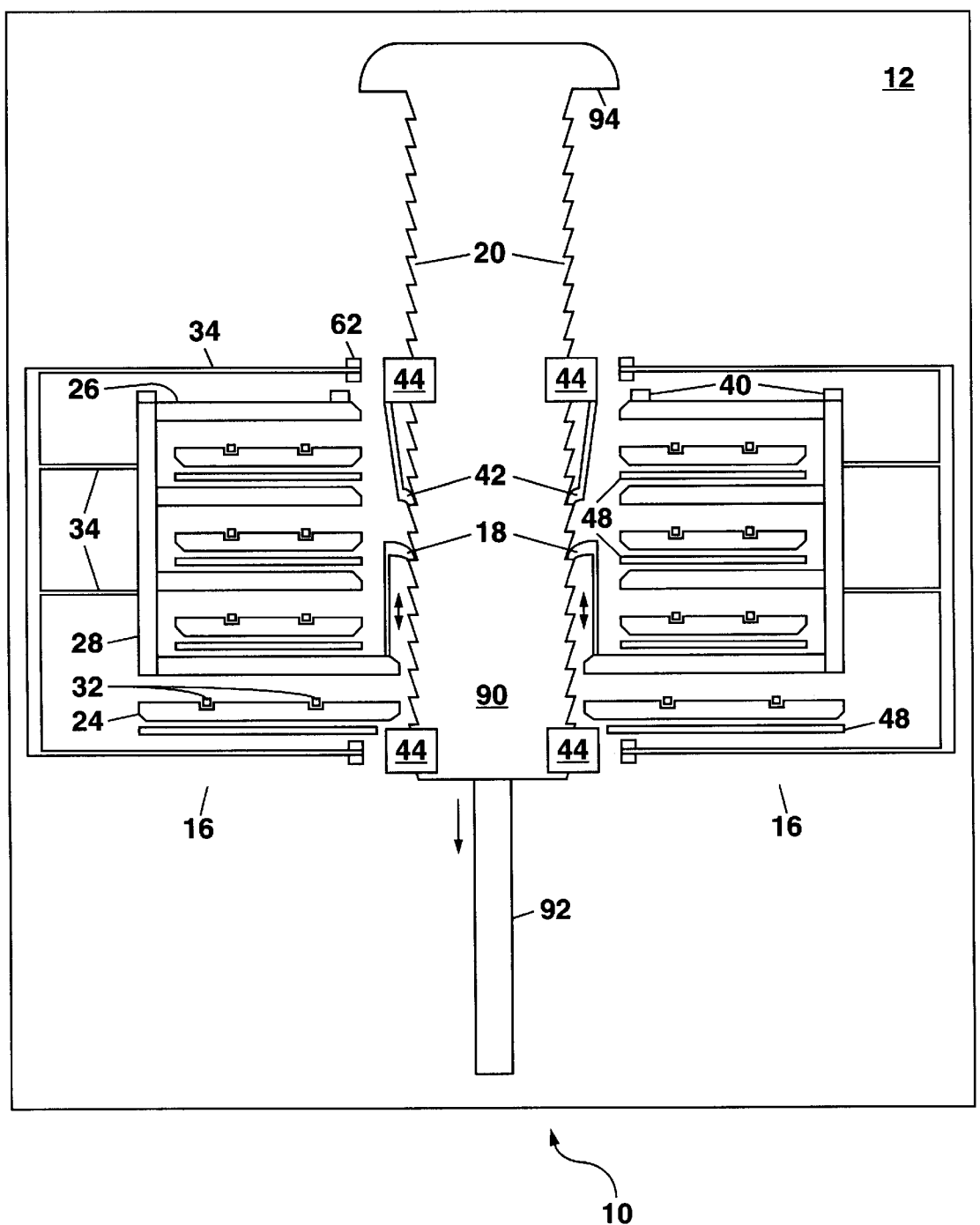
FIG. 9 shows a schematic plan view of a seventh example of a MEM ratcheting apparatus according to the present invention.

FIG. 9 schematically illustrates a seventh example of a MEM ratcheting apparatus 10 according to the present invention. In the example of FIG. 9, a linear rack or platform 90 is driven along a straight path on an optional track 92 by a pair of electrostatic actuators 16, with any out-of-plane motion of the rack 90 restrained by standoff tabs 44. The term "rack" is used herein to denote the moveable platform 90 in FIG. 7 by analogy to a conventional rack and pinion. In FIG. 7, each electrostatic actuator 16 has a pawl 18 which engages a plurality of indexing teeth 20 formed on a side of the rack 90 to urge the rack 90 along the track in a particular direction (indicated by the single-headed arrow).

In the example of FIG. 9, capacitive-plate electrostatic actuators 16 are used with each actuator 16 comprising a plurality of pairs of stationary electrostatic arms 24 and moveable electrostatic arms 26. The moveable electrostatic arms 26 are suspended above the substrate 12 by a plurality of restoring springs 34 (e.g. in a double folded-spring arrangement as shown in FIG. 9) and coupled together to move as a unit by attachment to a frame 28. Upon activation by a voltage applied between each pair of stationary and moveable electrostatic arms 24 and 26, each moveable electrostatic arm 26 is electrostatically forced towards its paired stationary electrostatic arm 24, executing a pull stroke which moves a pawl 18 connected to the moveable arm 26 forward to engage an indexing tooth 20 and urge the rack 90 forward by a distance corresponding to the separation of one or more of the indexing teeth 20. Forward motion of each moveable electrostatic arm 26 is arrested by a plurality of forward stops 32 which extend outward from each stationary electrostatic arm 24 to prevent short circuiting of the applied voltage. Forward motion of the rack 90 is arrested when end-stops 94 reach the nearest standoff tabs 44.

Upon removal of the applied voltage, the moveable electrostatic arms 26 and pawls 18 are urged backward by the action of restoring springs 34 in a return stroke of each actuator 16. One or more reverse stops 40 arrest the reverse motion of the moveable electrostatic arms 26. An optional anti-reverse mechanism 42 can eliminate the possibility of a backward motion of the rack 90 during a return stroke of the actuators 16 produced by the restoring springs 34.

In some embodiments of the present invention as shown in FIG. 9, the anti-reverse mechanism can be omitted and the electrostatic actuators 16 or indexing teeth 20 can be oppositely oriented on the two sides of the rack 90 so that one actuator 16 or set of actuators 16 can be activated to move the rack 90 forward, and another actuator 16 or set of actuators 16 can be activated to move the rack 90 backward. In this case, an additional electrostatic or thermal actuator can be provided to move selected pawls in a direction substantially perpendicular to the direction of the path of the moveable member so that these pawls 18 can be moved into or out of position to engage the indexing teeth 20.

Furthermore, although the rack 90 and track 92 are shown as being straight in FIG. 9, in other embodiments of the present invention, the rack 90 and track 92 can be curved. In this case, some adjustment may be needed to the length of the forward stroke provided by each of the electrostatic actuators 16. Finally, in other embodiments of the present invention, a plurality of pins 64 can be arranged along each side of the rack 90 to move the rack 90 based on the principles described herein with reference to FIG. 7.

Other applications and variations of the MEM ratcheting apparatus 10 of the present invention will become evident to those skilled in the art. For example, other drive arrangements of a plurality of electrostatic actuators 16 are possible for each of the examples of the MEM ratcheting actuator 10 described herein. Thus, one skilled in the art will recognize that it is generally possible to interchange the various types of actuators described herein. Thus, a thermal actuator 70 can be substituted for an electrostatic actuator 16), or one type of electrostatic actuator 16 (e.g. a comb actuator, or a hybrid actuator) can be substituted for another type of electrostatic actuator 16 (e.g. a capacitive-plate actuator). Furthermore, in some embodiments of the present invention, the restoring springs 34 can be omitted and a bi-directional comb actuator 16 used to provide both forward and backward motion of the ratcheting pawls 18. The actual scope of the invention is intended to be defined in the following claims when viewed in their proper perspective based on the prior art.

What is claimed is:

1. A microelectromechanical (MEM) apparatus formed on a substrate, comprising:
   (a) a member moveable about a straight or curved path, with the moveable member having a plurality of indexing elements extending outward from a surface or edge of the moveable member;
   (b) an electrostatic actuator providing reciprocating motion substantially parallel or tangential to the direction of the path, the electrostatic actuator further comprising:
      a plurality of pairs of electrostatic arms, with one electrostatic arm of each pair being stationary, and with the other electrostatic arm of each pair being moveable in response to a voltage applied across the pair of electrostatic arms; and
      at least one restoring spring operatively connected to the moveable electrostatic arms to restore the moveable electrostatic arms to a rest position in the absence of the applied voltage; and
   (c) at least one pawl operatively connected to the actuator and engageable with the indexing elements to urge the moveable member along the path by reciprocating motion of the pawl in a direction substantially parallel or tangential to the direction of the path.

2. The MEM apparatus of claim 1 wherein the substrate comprises silicon.

3. The MEM apparatus of claim 1 wherein the moveable member comprises polycrystalline silicon.

4. The MEM apparatus of claim 1 wherein the moveable member comprises a ring gear, and the path is circular.

5. The MEM apparatus of claim 1 wherein the moveable member comprises a rotary stage, and the path is circular.

6. The MEM apparatus of claim 1 wherein the moveable member comprises a rack.

7. The MEM apparatus of claim 1 wherein the indexing elements comprise teeth.

8. The MEM apparatus of claim 1 wherein the indexing elements comprise pins extending outward from a surface or edge of the moveable member.

9. The MEM apparatus of claim 1 wherein the stationary and moveable electrostatic arms of each pair of electrostatic arms are oriented substantially parallel to each other.

10. The MEM apparatus of claim 1 wherein the stationary and moveable electrostatic arms of each pair of electrostatic arms are oriented at an angle of less than twenty degrees with respect to each other.

11. The MEM apparatus of claim 1 wherein the stationary and moveable electrostatic arms of each pair of electrostatic arms include a plurality of fingers, with the fingers of each of the stationary electrostatic arms being interdigitated with the fingers of a corresponding moveable electrostatic arm.

12. The MEM apparatus of claim 11 wherein the fingers of the stationary and moveable electrostatic arms are substantially straight.

13. The MEM apparatus of claim 11 wherein the fingers of the stationary and moveable electrostatic arms are curved.

14. The MEM apparatus of claim 1 wherein the electrostatic actuator further includes an electrostatic shield located between the stationary electrostatic arm of one pair of the plurality of electrostatic arms and the moveable electrostatic arm of an adjacent pair of the plurality of electrostatic arms.

15. The MEM apparatus of claim 1 wherein the electrostatic actuator further includes at least one stop to prevent contact between the moveable electrostatic arm and the stationary electrostatic arm in each pair of electrostatic arms.

16. The MEM apparatus of claim 1 wherein the electrostatic actuator further includes a frame for supporting the moveable electrostatic arms, with the frame further supporting each pawl at one end thereof.

17. The MEM apparatus of claim 1 wherein each pawl is oriented to engage the indexing elements and urge the moveable member incrementally along the path upon the application of a voltage to the actuator.

18. The MEM apparatus of claim 1 wherein each pawl is oriented to engage the indexing elements and urge the moveable member incrementally along the path upon the removal of a voltage from the actuator.

19. The MEM apparatus of claim 1 further including an anti-reverse mechanism for restricting movement of the moveable member to a single direction along the path.

20. The MEM apparatus of claim 1 wherein the electrostatic actuator comprises a capacitive-plate electrostatic actuator.

21. A microelectromechanical (MEM) apparatus formed on a substrate, comprising:
  (a) an annular rotary member centered about an axis and having an inner circumference and an outer circumference, with one of the inner or outer circumference including a plurality of indexing elements spaced thereabout;
  (b) an electrostatic actuator located proximate to the annular member and producing reciprocating motion, the electrostatic actuator further comprising:
    a plurality of pairs of electrostatic arms, with one electrostatic arm of each pair being stationary, and with the other electrostatic arm of each pair being moveable in response to a voltage applied across the pair of electrostatic arms; and
    at least one restoring spring operatively connected to the moveable electrostatic arms to restore the moveable electrostatic arms to a rest position in the absence of the applied voltage; and
  (c) at least one pawl operatively connected to the actuator and moveable tangentially or in-line with the circumference about which the indexing elements are formed to engage the indexing elements and incrementally rotate the annular member.

22. The MEM apparatus of claim 21 wherein the substrate comprises silicon.

23. The MEM apparatus of claim 21 wherein the rotary member comprises polycrystalline silicon.

24. The MEM apparatus of claim 21 wherein the rotary member comprises a ring gear.

25. The MEM apparatus of claim 21 wherein the rotary member comprises a stage.

26. The MEM apparatus of claim 21 wherein the indexing elements comprise teeth.

27. The MEM apparatus of claim 21 wherein the indexing elements comprise pins extending outward from a surface or edge of the moveable member.

28. The MEM apparatus of claim 21 wherein the stationary and moveable electrostatic arms of each pair of electrostatic arms include a plurality of fingers, with the fingers of each of the stationary electrostatic arms being interdigitated with the fingers of a corresponding moveable electrostatic arm.

29. The MEM apparatus of claim 21 wherein the electrostatic actuator further includes an electrostatic shield located between the stationary electrostatic arm of one pair of the plurality of electrostatic arms and the moveable electrostatic arm of an adjacent pair of the plurality of electrostatic arms.

30. The MEM apparatus of claim 21 wherein the electrostatic actuator further includes at least one stop to prevent contact between the moveable electrostatic arm and the stationary electrostatic arm in each pair of electrostatic arms.

31. The MEM apparatus of claim 21 wherein the electrostatic actuator is located outside the outer circumference of the rotary member.

32. The MEM apparatus of claim 31 wherein the stationary and moveable electrostatic arms of each pair of electrostatic arms are oriented substantially parallel to each other.

33. The MEM apparatus of claim 21 wherein the electrostatic actuator is located inside the inner circumference of the rotary member.

34. The MEM apparatus of claim 33 wherein the stationary and moveable electrostatic arms of each pair of electrostatic arms are oriented at an angle of less than twenty degrees with respect to each other.

35. The MEM apparatus of claim 21 wherein the electrostatic actuator comprises a capacitive-plate electrostatic actuator.

36. A microelectromechanical (MEM) apparatus formed on a substrate, comprising:
  (a) a ring gear rotatable about an axis and having a plurality of indexing teeth spaced about an inner circumference thereof and a plurality of drive teeth spaced about an outer circumference thereof;
  (b) a rotary electrostatic actuator formed within the inner circumference of the ring gear and further comprising:
    a plurality of pairs of electrostatic arms arranged about the axis and extending outward therefrom, each pair of electrostatic arms including a stationary electrostatic arm and a moveable electrostatic arm, with the moveable electrostatic arm being incrementally rotatable about the axis in response to an applied voltage; and
    at least one restoring spring operatively connected to the moveable electrostatic arms to restore the moveable electrostatic arms to a rest position upon removal of the applied voltage; and
  (c) at least one pawl operatively connected to the moveable electrostatic arm and engageable with the ring gear to incrementally rotate the ring gear upon application or removal of the applied voltage.

37. The MEM apparatus of claim 36 wherein the substrate comprises silicon.

38. The MEM apparatus of claim 36 wherein the ring gear comprises polycrystalline silicon.

39. The MEM apparatus of claim 36 wherein the stationary and moveable electrostatic arms of each pair of electrostatic arms are oriented substantially parallel to each other.

40. The MEM apparatus of claim 36 wherein the stationary and moveable electrostatic arms of each pair of electrostatic arms are oriented at an angle of less than twenty degrees with respect to each other.

41. The MEM apparatus of claim 36 wherein the stationary and moveable electrostatic arms of each pair of electrostatic arms include a plurality of fingers, with the fingers of the stationary electrostatic arm being interdigitated with the fingers of the moveable electrostatic arm.

42. The MEM apparatus of claim 36 wherein the rotary electrostatic actuator further includes an electrostatic shield located between the stationary electrostatic arm of one pair of the plurality of electrostatic arms and the moveable electrostatic arm of an adjacent pair of the plurality of electrostatic arms.

43. The MEM apparatus of claim 36 wherein the rotary electrostatic actuator further includes at least one stop to prevent contact between the moveable electrostatic arm and the stationary electrostatic arm in each pair of electrostatic arms.

44. The MEM apparatus of claim 36 wherein the rotary electrostatic actuator further includes a frame for supporting the moveable electrostatic arms and each pawl.

45. The MEM apparatus of claim 36 wherein the electrostatic actuator comprises a capacitive-plate electrostatic actuator.

* * * * *